United States Patent
Baumgartner

(10) Patent No.: US 6,628,007 B1
(45) Date of Patent: Sep. 30, 2003

(54) ELECTRIC IGNITION CIRCUIT FOR A MOTOR VEHICLE OCCUPANT PROTECTION SYSTEM

(75) Inventor: Walter Baumgartner, Zeitlarn (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/601,402
(22) PCT Filed: Dec. 1, 1999
(86) PCT No.: PCT/DE99/03846
§ 371 (c)(1),
(2), (4) Date: Dec. 1, 2000
(87) PCT Pub. No.: WO00/32445
PCT Pub. Date: Jun. 8, 2000

(30) Foreign Application Priority Data

Dec. 1, 1998 (DE) .......................... 198 55 444
Apr. 23, 1999 (DE) .......................... 199 18 634

(51) Int. Cl.[7] .................................................. B60L 1/00
(52) U.S. Cl. .................... 307/10.1; 307/9.1; 180/282
(58) Field of Search ................... 180/282; 280/735; 307/10.1, 9.1

(56) References Cited

U.S. PATENT DOCUMENTS

| | | | | |
|---|---|---|---|---|
| 4,243,248 A | * | 1/1981 | Scholz et al. | 280/735 |
| 5,176,214 A | * | 1/1993 | Taufer et al. | 180/268 |
| 5,657,831 A | * | 8/1997 | Furui | 180/282 |
| 5,796,177 A | * | 8/1998 | Werbelow et al. | 307/10.1 |
| 5,957,490 A | * | 9/1999 | Sinnhuber | 280/735 |
| 6,072,246 A | * | 6/2000 | Schafer | 307/10.1 |
| 6,363,307 B1 | * | 3/2002 | Ikegami | 701/45 |

FOREIGN PATENT DOCUMENTS

| | | |
|---|---|---|
| DE | 27 45 620 | 4/1979 |
| DE | 42 10 861 | 10/1992 |
| DE | 43 19 001 | 12/1993 |
| DE | 43 06 488 | 9/1994 |
| DE | 196 08 393 | 9/1997 |

* cited by examiner

Primary Examiner—Brian Sircus
Assistant Examiner—Robert L. Deberadinis

(57) ABSTRACT

Two different switching signals for switching through the safety switching element (22) for the second firing stage of an occupant protection component which can be triggered in multiple stages are formed in the control device (3). The two switching signals are emitted to different outputs (14, 16) of the control device (3) and then subjected to an AND operation.

16 Claims, 2 Drawing Sheets

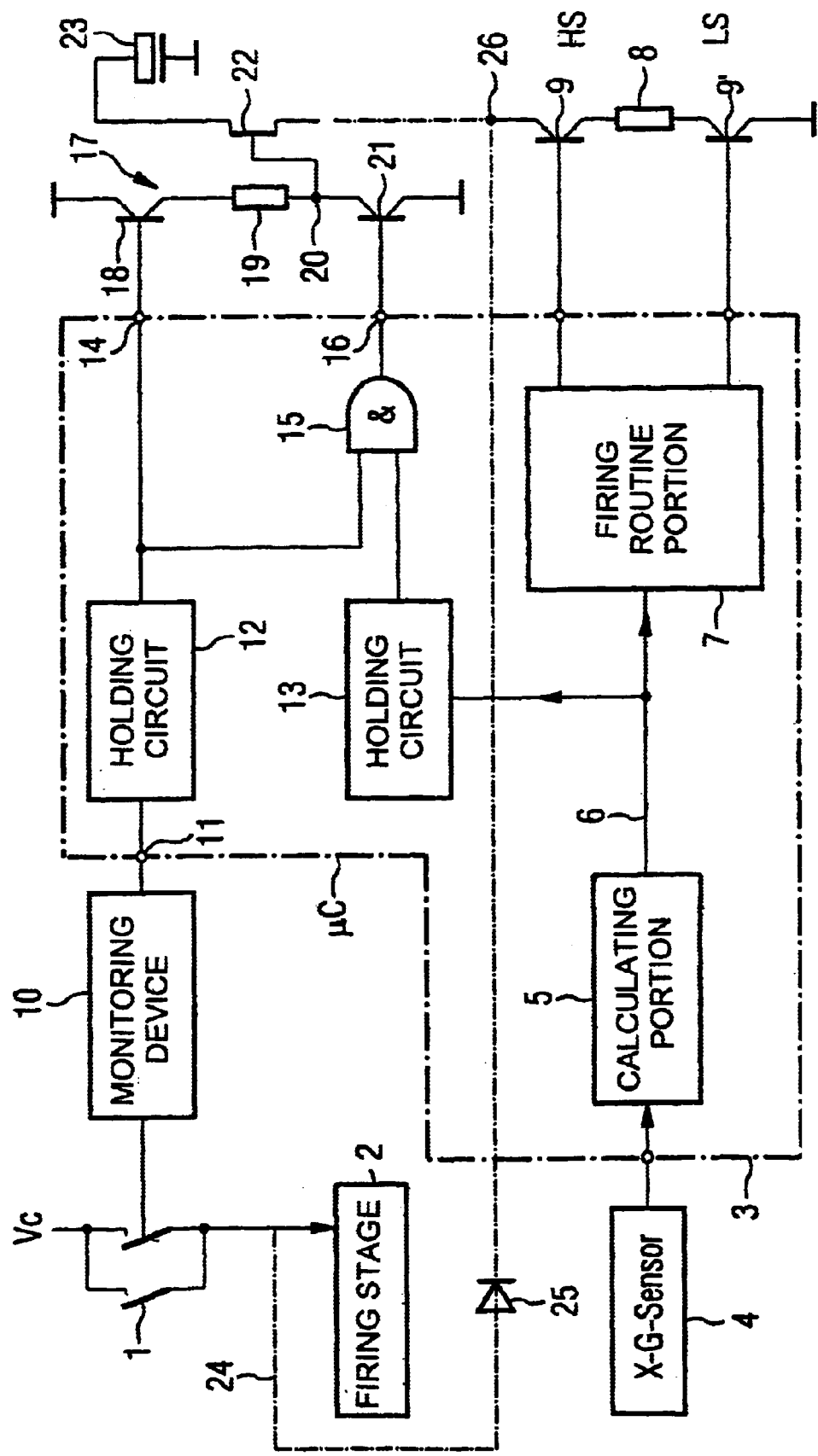

ELECTRIC IGNITION CIRCUIT FOR A MOTOR VEHICLE OCCUPANT PROTECTION SYSTEM

BACKGROUND OF THE INVENTION

1. Field of the Invention

The invention relates to a firing circuit for a motor vehicle occupant protection system.

2. Description of the Related Art

Such a firing circuit is already in practical use and serves for triggering the protection system in the event of a motor vehicle accident (which is about to happen or has just occurred). The motor vehicle occupant protection system may in this case comprise one or more airbags, for example front airbags and side airbags, a belt-tensioning system and/or other components protecting the occupants of the motor vehicle in an accident.

To avoid inappropriate triggering of the occupant protection system, in addition to the crash sensors, for example acceleration sensors, the firing circuit is usually provided with a safety sensor, which serves as a redundant crash sensor and, for example, closes, and consequently allows the activation of the primer, only after a predetermined minimum acceleration value is exceeded. The safety sensor lies in series with the firing stage activating the primer, so that the primer current flows via the safety sensor. The safety sensor and its switching contacts must consequently be able to withstand high currents in order that they can carry the firing current essentially without any loss or interruption. Moreover, the safety sensor must be designed in such a way that it maintains its switched-on state continuously for at least a certain minimum time period which must be equal to or greater than the minimum current-flow time period necessary for reliable primer firing.

In order that a safety function is also provided for the second and possibly further firing stages in occupant protection components which can be triggered in multiple stages, each firing stage may be equipped with its own mechanical safety switch, which however gives rise to high expenditure. If, on the other hand, only a single safety switch is used for all the firing stages of this occupant protection component, it is not possible for the safety function to be designed optimally for the individual firing stages, for example the respective safety time windows during which the triggering of the individual firing stages is permitted.

BRIEF SUMMARY OF THE INVENTION

The invention is based on the object of providing for a motor vehicle occupant protection system with at least one occupant protection component which can be fired in multiple stages an electric firing circuit which makes good adaptation of the safety functions possible for the firing stages of the occupant protection component which can be triggered in multiple stages.

This object is achieved by the features mentioned in patent claim 1.

Advantageous configurations of the invention are specified in the subclaims.

In the invention there is an electronic switching element which is controlled by the safety switch and is connected in series with the firing stage, that is to say carries the firing current when the primer is triggered. The electronic switching element has no mechanical internal switching contacts and can be designed without any problem to withstand the appropriate current load, so that essentially loss-free, reliable carrying of the firing current is ensured. This configuration at the same time facilitates the integration of the switching element into a firing circuit IC, which contains for example the electronic control device and the firing transistor, controlled by the latter and connected in series with the primer. The safety switch now only has to carry the driver signal, but no longer the firing current, and, with a significantly reduced nominal current intensity, can consequently be made in a very compact and low-loss type of design.

Preferably connected between the safety switch and the switching element is a timing element, in the simplest case a holding circuit, which maintains the switching element driver signal for a certain time period, corresponding at least to the firing-current flow period necessary for reliable primer firing. This ensures that the switching element remains reliably switched-through for the necessary minimum time period, even if the safety switch happens to have already opened again prematurely. As a result, the requirements which the safety switch has to meet are at the same time reduced considerably, since no specific minimum closing time period has to be ensured. Even only brief closing of the safety switch is sufficient to allow the firing to be executed via the holding element and the electronic switching element at a desired firing instant, fixed by the control device, and with the necessary current flow period within the time window, which is dictated by the timing element and is made to be of an adequate size.

The timing element may also provide alternatively, but preferably additionally, a time delay function, so that the switching element is activated only with a certain time delay after closing of the safety switch. This may be of advantage in particular in the case of multi-stage firing circuits containing a plurality of firing stages if they are to be fired at different times. The safety switch may in this case be connected directly to a further firing stage and allow activation of the latter during its closed state, while the safety time window for that firing stage which is coupled to the electronic switching element is opened only after a time delay and consequently firing of the primer of this firing stage (controlled by the control device controlling this firing stage) is possible only after the beginning of this time window.

The firing stages are preferably provided with separate, own energy stores, so that in each case only the firing currents of the assigned primers flow via the switching elements providing the safety function (mechanical or electrical safety sensor or electronic switching element). Consequently, the maximum current loading of the individual safety elements is significantly less than if a single safety sensor is provided for all the firing circuits, so that these safety elements can be designed for a lower current carrying capacity. Furthermore, on account of this substantial decoupling, even in the event of a fault in the switching through of the safety element of one stage there is still a certain probability that at least the safety function of the other firing stage is correctly ensured and consequently the primer of the latter can be triggered at the correct time.

In particular in the case of a single-stage firing circuit, the safety switch may be formed by a simple mechanical trigger switch, for example a micromechanical acceleration switch, which merely has to generate a weak switching signal when the predetermined limit value of the physical parameter to be sensed, for example the acceleration, is reached or exceeded and which also does not have to have its own signal-holding capability, for example hysteresis. The safety switch can consequently be designed in a miniaturized form for only a low current carrying capacity, so that the overall dimensions of the firing circuit can be reduced. The safety switch may, however, also be designed as a sensor with a downstream integrator and threshold-value decision circuit, in which an acceleration-dependent output signal of the sensor is also integrated and is compared with a threshold value.

The electronic switching element may be of any desired design, provided that its ability to be controlled by a driver signal and a current carrying capacity adequate for the firing current are ensured. A transistor, for example a field-effect transistor, is preferably used, being available with high functional reliability, low expenditure and preferably also in an integrated design.

In the case of the invention there is for the second firing stage an electronic safety switching element, the switching state of which is controlled in dependence on two different input variables (switching signals). This makes it possible for the safety function of the second firing stage to be specifically fixed. The two switching signals are preferably formed in dependence on the switching state of the mechanical safety switch and with the firing triggering decision of the control device for the second firing stage taken into account. This allows not only increased redundancy with corresponding improvement in immunity to inappropriate triggering to be achieved but also the safety function to be sensitively adapted to the current evolvement of an accident.

The safety switching element may be formed, for example, by two power switching elements which are connected to each other, for example connected in series, the control inputs of which are subjected separately to respectively differently formed control signals and which release the primer firing current only when both switching elements are activated. Alternatively, it is also possible to provide in the primer firing current only a single safety switching element, designed as a circuit breaker, and to fix its control signal in dependence on two control signals which have, for example, been combined by an AND operation.

The one switching signal may be formed by a timing element, in particular a holding circuit, which generates the one switching signal when the mechanical safety switch is closed, but still maintains it for a certain time interval even after opening of the safety switch. The other switching signal may likewise be formed by a timing element, such as a holding circuit for instance, which is controlled by the firing signal generated by the control device for firing the second firing stage and is designed such that it generates the second switching signal for a certain time period even after ending of the firing signal. Consequently, activation of the safety switching element is ensured for an adequate duration even after opening of the mechanical safety switch or after ending of the firing signal for the second stage. If, however, on the other hand, there is an excessive time interval between the reopening of the mechanical safety switch and the firing decision for firing the second firing stage, the two switching signals are not generated with an overlap, so that the safety switching element is not activated and consequently a good safety function is ensured in the sense of suppressing inappropriate triggering.

The holding circuits are preferably designed as a component part of the control device, which itself contains the triggering algorithm for the second firing stage and also the firing routine.

The two switching signals are emitted to separate outputs of the control device, preferably designed in the form of a microcontroller or microprocessor, and are then combined externally with each other to achieve the safety function. This further increases the immunity to inappropriate triggering in comparison with a case in which only a single output for generating a single switching signal would be generated for the switching through of the safety switching element. This is because there is a very low probability that, in the event of malfunctions, the control device will firstly generate at both switching signal outputs such signals that the safety switching element is activated and will secondly also generate at the same time firing signals for the actual firing of the primer.

To increase the probability of firing when firing of the second firing stage is required, the power supply of the latter is preferably of a redundant design, that is on the one hand via the supply link containing the safety switching element and on the other hand via a power supply provided directly by the mechanical safety switch, preferably via a rectifier diode. This latter power supply consequently represents to a certain extent a bypass for the safety switching element, which however is activated only during the closed state of the mechanical safety switch and consequently provides, at least during this critical phase, a redundant power supply for the second firing stage as and when it is required.

BRIEF DESCRIPTION OF THE SEVERAL VIEWS OF THE DRAWINGS

The invention is described in more detail below on the basis of exemplary embodiments with reference to the drawings, in which:

FIG. 3 shows a further exemplary embodiment of the invention.

DETAILED DESCRIPTION OF THE INVENTION

Figure 1:
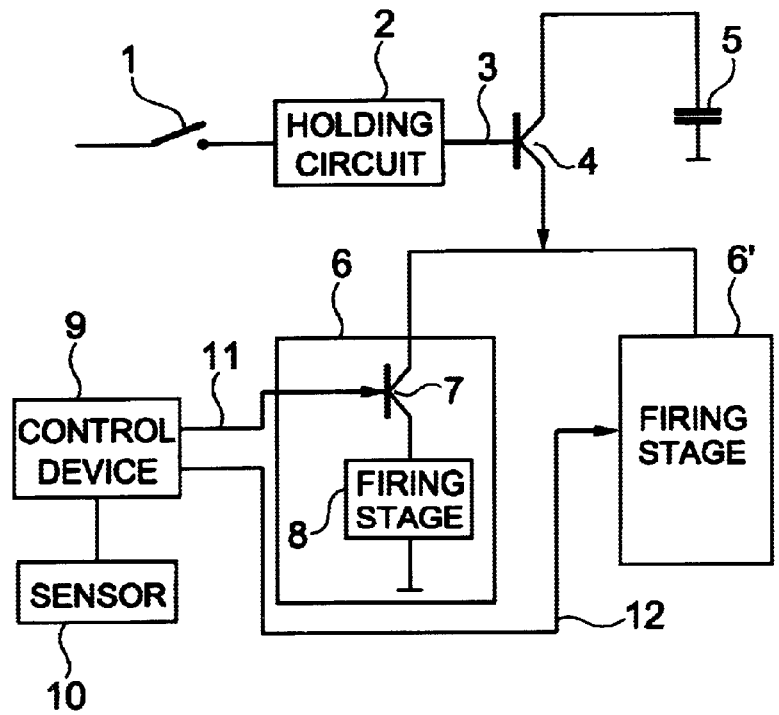
FIG. 1 shows a firing circuit with a safety switch in the form of a mechanical trigger switch.

In the drawings, only the firing circuits for the motor vehicle occupant protection system are represented. Apart from the firing circuit, the occupant protection system is constructed in a conventional way and has, for example, airbags which are triggered by the primers, a belt-tensioning system, a swing-out rollover bar and/or the like. The electric firing circuit shown in FIG. 1 contains a mechanical trigger switch (mechanically actuable switching element) 1, which serves as a safety switch, responds to a certain physical parameter, for example the acceleration, an angular position, the rate of rotation or the like, and is closed if an internally mechanically predetermined threshold value of the measured parameter is exceeded. The trigger switch 1 is fixedly installed in the vehicle and is consequently subject to the same physical parameters as the motor vehicle containing the occupant protection system.

The trigger switch 1 is connected by one terminal to a fixed voltage potential, of for example 5 V, and by its other terminal to a timing element in the form of a holding circuit 2, which is activated when the trigger switch 1 closes and emits an electric signal with a certain amplitude, at for example 5 V, for a predetermined time period on an output line 3. This time period is dimensioned such that it is at least as great as the maximum firing period required at most after the response of the trigger switch 1 for firing the associated primer. The output line 3 is connected to the control terminal of an electronic switching element 4 in the form of a transistor, which is controlled to a state of saturation, that is to say is fully switched-through, by the signal emitted by the holding circuit 2 in the activated state of the latter.

The transistor 4 is connected to a storage capacitor 5, which stores and provides the firing energy, is charged by the onboard motor-vehicle battery and has an energy content adequate for the reliable firing of the primers of the firing circuit provided. Connected to the other terminal of the transistor 4 in parallel are two firing stages 6, 6', which may have an identical or different internal construction.

The firing stage 6 contains an electronic switching element in the form of a firing transistor 7, which is connected in series with a primer 8, the other terminal of which is connected for instance to ground potential. The control terminal of the firing transistor 7 is controlled by an electronic control device 9, for example a microprocessor, which senses an impending or already occurred motor-vehicle accident by means of sensors 10, for example acceleration sensors, and then, if a triggering of the occupant protection system is required, generates on a line 11 a driver signal switching through the firing transistor 7 at the desired point in time.

The mechanical trigger switch 1 closes already at a somewhat lower threshold value of the physical variable to be monitored than that value at which the control device 9 orders the necessity for a triggering of the occupant protection system, so that the transistor 4 is already switched through by means of the holding element 2. When the firing transistor 7 switches through, consequently the energy stored in the energy storage capacitor 5 is discharged into the primer 8 and, provided that the second firing stage 6' has been or is connected through as well, also into the primer that is present in this firing stage 6' but is not separately shown. In order that a selective, and if need be also time-shifted, firing of the primer in the firing stage 6' can be achieved, the firing transistor contained in the firing stage 6' and connected in series with the primer there, but not separately represented, is controlled by the control device 9 via a separate control line 12.

The firing stages 6, 6' are preferably provided in a known way with a current-limiting function, which can be achieved for example by corresponding reduced control-factor setting of the firing transistors 7. This ensures that the energy stored in the common energy storage capacitor 5 is reliably adequate for firing all the primers present in the firing stages 6, 6' and possibly further firing stages connected to the energy storage capacitor 5. To reduce the energy requirement, in this case there may also be provision for the firing transistor of the first-firing firing stage to be switched off immediately after successful firing or after expiry of the time interval provided as the maximum interval for the firing, so that no further firing current is then taken up in this already-fired firing stage.

Only a single firing transistor 7 and a single primer 8 are shown in the firing stage 6. Depending on requirements, further primers and/or firing transistors may also be provided, however, so that a plurality of components, for example the front airbags, can be triggered at the same time in this first firing stage.

The timing element 2 is designed in this case such that, even when the trigger switch 1 is switched on only for a short time, it emits an output signal of such a duration that it is ensured that the transistor 4 remains switched-through during the entire time period provided as a maximum for the triggering of all the primers of all the connected firing stages.

The transistor 4 is consequently functionally connected in series with the firing transistor or transistors 7 and the primer or primers 8, this series connection lying in parallel with the energy storage capacitor 5.

The firing stage 6 may serve for example for firing the primers for driver and/or passenger airbags to be triggered in multiple stages as well as for firing a belt-tensioning system, while the firing stage 6' may serve for firing the second stage of the airbags a short time later, or for triggering other airbags or safety systems.

Figure 2:
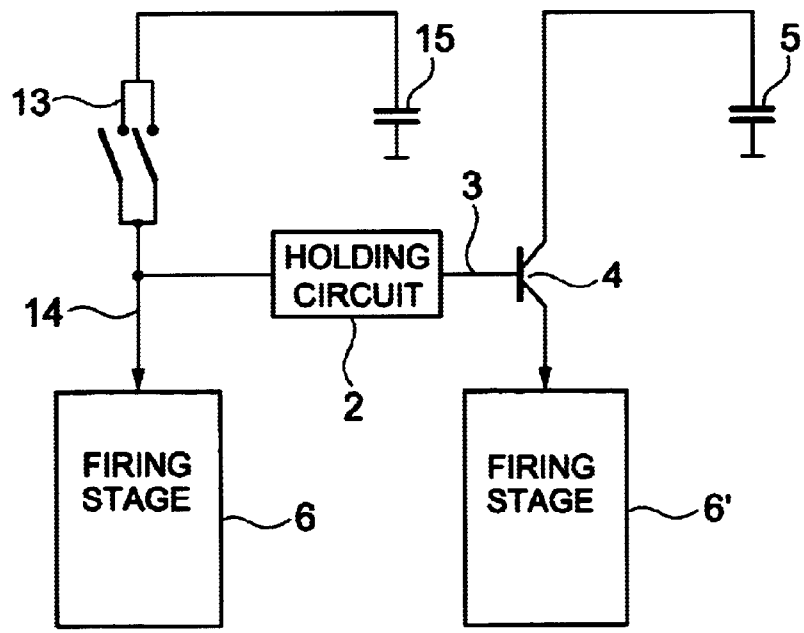
FIG. 2 shows an exemplary embodiment of the invention with a mechanical safety sensor and firing stages that are separate in terms of their firing current.

Represented in FIG. 2 is an exemplary embodiment of the invention in which there are separate energy stores for the two firing stages 6 and 6'. Their construction and mode of operation may be the same as in the case of the exemplary embodiment according to FIG. 1, explained above, so that no further comments are required. The control by the control device 9, not separately shown, together with sensors 10 and lines 11, 12 may also be identical. The holding circuit 2, the electronic switching element 4 and the energy storage capacitor 5 may also have the same construction and the same mode of operation as in the case of the first exemplary embodiment and are therefore not explained in any more detail.

This exemplary embodiment differs from the first exemplary embodiment in particular to the extent that a mechanical safety sensor 13, which is connected directly to the first firing stage 6 via a line 14, is used as the safety switch, and that in addition to the energy storage capacitor 5 there is provided a further energy storage capacitor 15, which is connected to the safety sensor 13 and consequently provides the firing energy for the firing stage 6 via said sensor. The safety sensor 13 is designed, for example, as a mechanical acceleration switch which closes when a certain motor-vehicle acceleration signalling an impending or already occurred accident is exceeded, so that the voltage applied to the firing storage capacitor 15 is then applied to the firing stage 6 and the latter can fire the primer when the firing transistor 7 is switched through.

The safety sensor 13 may, however, also be designed in some other known way, for example as an inertia switch, an inclination switch, which closes as from a certain inclined position of the vehicle, or the like. As soon as the safety sensor 13 closes, the voltage of the firing storage capacitor 15 is applied not only to the firing stage 6 but also to the input of the timing element 2 connected to the line 14, so that said timing element is activated, and a driver signal is applied via the output line 3 to the switching element 4 with a time period which is adequately long to allow the second firing stage 6', which may fire only on a time-shifted basis, to be fired fully and as planned. The timing element 2 also ensures here that the switching element 4 remains continuously switched-through during the maximum firing time interval required for the second firing stage 6', even if the safety sensor 13 has already opened again.

In the case of such a time-shifted firing of the second firing stage 6', the timing element 2, that is to say the holding circuit, may also be provided with an internal time delay, by which the rising edge of the driver signal emitted on the output line 3 is delayed by a certain time interval with respect to the rising edge of the voltage applied to the timing element 2 on the input side. This time interval is dimensioned such that it is at most equal to the time shift predetermined by the system between the firings of the primers of the first firing stage 6 and of the second firing stage 6'. This ensures that a firing of the primer(s) of the second firing stage 6' can take place at the earliest only with the desired time shift with respect to the firing of the first firing stage 6, even if the control device 9 has already generated in advance a driver signal effecting the switching through of the firing transistor provided in the firing stage 6'. This time delay function consequently has the effect of additionally ensuring maintenance of the desired firing time shift between the firing stages 6 and 6', which is primarily dictated by the control device 9. The time delay effected by the holding circuit 2 can also be set to a smaller value than the firing time shift between the firing stages 6 and 6', for example to 50% to 80% of this time shift, so that it is ensured that the switching element 4 has almost certainly already switched through before the firing transistor of the firing stage 6'.

According to FIG. 2, the safety sensor 13 is designed as a double switch, so that the current flow can be divided between the two switching branches. The safety sensor 13 may, however, also be designed as a single switch with a single switching contact.

According to FIG. 2, consequently the first firing stage 6 of the occupant protection system can be fired by means of the mechanical safety sensor 13 in the previously customary way. The second firing stage 6' has, however, to a certain extent an electrical or electronic safety switch of its own, that is the switching element 4, which is dependent on the safety sensor 13 only to a limited extent.

In the case of a modified embodiment, it is also possible to use as the safety switch 4 an own, mechanical or electrical safety sensor which is constructed fully independently of the safety sensor 13 and, for example, in an identical way. In this case, it is also possible to dispense with the holding circuit 2.

The separation of the energy storage that is provided for the firing stages 6 and 6' according to FIG. 2 makes it possible to reduce the capacitance values of the firing storage capacitors 5 and 15 in comparison with the capacitance value required in the case of FIG. 1. This is because in this case there is no risk of the first firing stage 6, fired at an earlier time, being able to reduce the energy reserve provided for the firing stage 6' below the required minimum value, since the firing storage capacitor 5 cannot discharge into the firing stage 6. Furthermore, the safety sensor 13 and the switching element 4 also have to be designed only for a lower current carrying capacity on account of the separation of the firing circuits, since the current flowing at most through the safety sensor 13 or the switching element 4 is lower than the aggregate current flowing at most through the switching element 4 in the case of FIG. 1.

In the exemplary embodiments above, two firing stages are provided. It is also possible, however, according to requirements, to provide a third or further firing stage, which may then be provided, according to the model of FIG. 2, with its own energy storage capacitor and its own switching element together with an associated holding circuit (in each case connected on the input side to the safety sensor 13), or else may be connected, according to the model of FIG. 1, in parallel to the output of the switching element 4.

It is consequently possible with the invention to provide two-stage or, generally, multi-stage firing generators with a plurality of firing stages, that is to say multi-stage firing, which permits the use of different types of firing stages and/or account to be taken of different types of protective effects of the respective firing stages, and to equip the firing stages as required with their own safety switches. In this case, however, it is ensured that the safety switches do not hinder the firing of individual firing stages, even if they have already opened again. The invention consequently makes possible different arrangements and connections of the firing stages to achieve desired system configurations, so that "smart safety" systems can be constructed, suitable if appropriate for complex crash modes and permitting the reliable determination and maintenance of desired firing shifts or the like.

The exemplary embodiment of the firing circuit represented in FIG. 3 in the form of a block diagram comprises a safety switch 1, which is designed as a mechanical switch, for example a switch which closes when a certain acceleration value is exceeded, and has been inserted in the voltage supply path of a first firing stage 2, which controls in a way known per se the firing of the first stage of the occupant protection component which can be triggered in two stages, for example an airbag which can be triggered in two stages. The safety switch 1 is preferably designed to be redundant in the way represented, with two internal parallel-connected clearances between contacts and is connected on the input side to the onboard voltage $V_c$ or some other supply voltage. The firing stage 2 contains in a way known per se a switching element which is connected to the primer and, when it is activated, provides the primer with current and fires it.

Provided for controlling the second firing stage is a control device, which is designed here as a microcontroller 3 and is connected on the input side to an accident sensor 4, for example the central acceleration sensor or an outside collision sensor, the sensor signal of which signals the intensity and progression of the evolution of an accident. The output signal of the accident sensor 4 may also be evaluated, if appropriate, by the control device of the first firing stage 2 for making the triggering decision there. The control device 3 contains a calculating portion 5, which evaluates the output signal of the accident sensor 4 according to a triggering algorithm designed for the firing stage 2. If the calculation performed in the calculating portion 5 indicates the necessity for triggering the second firing stage, a triggering command is issued via a connecting line 6 to a firing routine portion 7, which then generates control signals via two outputs of the control device 3 for switching through two firing transistors 9, 9', which are connected in series with the primer 8 of the second firing stage in such a way that the primer 8 lies between the firing transistors 9, 9'.

A monitoring device 10 monitors the switching state of the safety switch 1 and emits during the ON period of the latter a reply signal, at for example a high level of 5 volts, to an input 11 of the control device 3. The monitoring device 10 may be connected for example on the input side to the output of the safety switch 1 and apply the potential respectively present there, which is high when the safety switch 1 is closed, to the input 11, if appropriate after voltage limitation to 5 V in adaptation to the potential range which can be withstood by the control device 3. The control device 3 contains a first timing element 12, which is designed for example as a holding circuit and the output signal of which follows the progression of its input signal, although the falling edge is delayed by a certain time interval, of for example 100 ms, predetermined by the holding circuit, so that the output signal is present for longer than the input signal by this time period. This ensures that the output signal of the timing element 12 is also still present for a short time when the mechanical safety switch 1 has already opened again. The control device 3 is provided with a second timing element 13, preferably likewise designed in the form of a holding circuit, which responds to the firing signal transmitted on the line 6 and generates a high-level output signal during the time period of said signal and an additional time interval following on from the latter and determined by the holding period of the holding circuit. The holding period of the timing element 13 is set, for example, to 50 ms, so that the output signal of the timing element 13 is present for 50 ms longer than the firing signal.

The output signal of the timing element 12 is applied on the one hand to an output 14 of the control device 3 and on the other hand to an input of an AND element 15, at the other input of which the output signal of the timing element 13 is present. The output of the AND element 15 is applied to an output 16 of the control device 3. Connected to the two outputs 14 and 16 is a logic circuit, here in the form of a transistorised AND circuit 17 with two transistors 18 and 21 connected in series between voltage supply terminals and with a load resistor 19 interposed. The connecting point between the load resistor 19 and the transistor 21 forms the output 20 of the AND element 17, which is connected to the control terminal of an electronic safety switching element 22 in the form of a switching transistor (safety transistor). The safety switching element 22 is connected between an energy store 23, providing the firing energy for firing the primer 8, and the firing transistor 9, so that it is possible to provide the primer 8 with current only when the safety switching element 22 is closed (and the firing transistors 9, 9' are closed). The safety switching element 22 has been switched through only if high-level switching signals are emitted at both outputs 14 and 16, with the effect of switching through the transistor 18 and blocking the transistor 21. This is only the case if both the holding circuit 12 and the holding circuit 13 respectively generate positive output signals, by which it is indicated that the respective input signals are still present at the time or at least have decayed before less than the holding time period. This allows a switching through of the safety switching element 22 for a certain time interval even after an input signal has already decayed, but only for a predetermined time interval.

Additional redundancy is achieved by the AND element 15, which is controlled in dependence on the output signal of the holding circuit 12, since an output signal is no longer generated at either output 14 or 16 after expiry of the holding period of the timing element 12, i.e. after more than 100 ms following renewed opening of the mechanical safety switch 1, even if a (belated) firing decision has been generated by the calculating portion 5. It is also possible, if appropriate, to dispense with the AND element 15, so that then the output of the timing element 13 is connected directly to the output 16. Furthermore, it is ensured by the shorter time period to which the timing element 13 is set in comparison with the timing element 12 that the safety function can be released, i.e. the safety switching element 22 is able to be switched through, only during a limited time interval after decay of the firing signal.

In the case of the firing circuit, the safety switching element 22 is consequently designed to be redundant with respect to the safety switch 1 and is controlled selectively by the two switching signals emitted at the outputs 14 and 16 in dependence on different switching criteria (closed state of the mechanical safety switch 1; generation of the firing signal for the firing stage 2). The necessity that two terminals of the microcontroller (control device) 3 have to be activated for the switching through of the safety switching element provides greater immunity to inappropriate switching on of the safety switching element. Hardware and software are to a certain extent duplicated, i.e. provided with redundancy, so that there is increased dependability.

To increase redundancy and consequently functional reliability, in the case of the configuration according to the invention an additional voltage supply for the firing path containing the primer 8 is also provided. For this purpose, the output of the safety switch 1 is connected via a line 24 to a connecting point 26 between the safety switching element 22 and the firing transistor 9, so that a supply voltage which is adequate for firing the primer 8 when the firing transistors 9 and 9' are switched through is applied to the connecting point 26 when the mechanical safety switch 1 is closed. A diode 25, which prevents current from flowing in the opposite direction, for example from the safety switching element 22 to the first firing stage 2, has been connected into the connecting line 24. Instead of being connected to the output of the safety switch 1, the connecting line 24 may alternatively also be connected internally to the first firing stage 2, for example to a connecting point which is provided with voltage during the firing of the primer of the first firing stage and, if appropriate, for a certain time interval following this. In this case, the voltage feeding of the connecting point 26 via the connecting line 24 is then advantageously commenced at the earliest only when the firing of the first firing stage begins, and not already when the mechanical safety switch 1 closes. This additional voltage supply may also be realised independently of the configuration explained above of the safety switching element and its activation.

What is claimed is:

1. An electric firing circuit for a motor vehicle occupant protection system, with at least two firing stages for triggering an occupant protection component firing in at least two stages, each firing stage having at least one firing pellet and a switching element which is connected in series with said firing pellet for control by a control device, and with a safety switch, which responds to a physical parameter and releases a current feed to at least one of the firing stages when a certain threshold value is exceeded, but otherwise blocks said feed, the second firing stage, provided for the firing of the second stage of the occupant protection component, being connected to an electronic safety switching element, the control terminal of which is coupled to the safety switch and placed into the switched-through state by the safety switch, and a holding circuit connected between the safety switch and the control terminal of the switching element, the holding circuit being activated and applying a driver signal to the control terminal with a certain minimum time period when the safety switch closes.

2. The firing circuit as claimed in claim 1, characterized in that the input of the holding circuit is fed a firing signal generated by the control device (3) for triggering the second firing stage, and the output signal of which forms the second switching signal, if appropriate after being combined with the first switching signal.

3. The firing circuit as claimed in claim 1, characterized in that the timing element contains a time delay function and the driver signal is present at the switching element only after a predetermined delay time period after the closing of the safety sensor.

4. The firing circuit as claimed in claim 1, characterized in that the safety switch (1) is designed as a mechanical trigger switch, which merely generates the switching signal for the switching element (4), but does not carry the primer firing current, when a physical parameter which signals an accident and is monitored by the trigger switch occurs.

5. The firing circuit as claimed in claim 1, characterized in that the first firing stage (8, 9, 9'), provided for the firing of the first stage of the occupant protection component, is connected directly to the safety switch (13), so that when there is a firing release of the first firing stage the safety switch carries the firing current required for this purpose.

6. The firing circuit as claimed in claim 5, characterized in that the firing stages (6, 6') have separate energy storage capacitors (5, 15), of which one is connected to the safety switch (13) and the other is connected to the switching element (4).

7. The firing circuit as claimed in claim 1, characterized in that the electronic switching element (4) is a transistor.

8. The firing circuit as claimed in claim 1, characterized in that the control device (3) is designed such that, for controlling the switching state of the safety switching element (22), it generates two different switching signals in dependence on different criteria, in particular depending on the state of the safety switch (1) and a firing decision of the control device (3), taken for the second firing stage.

9. The firing circuit as claimed in claim 8, characterized by a logic element (17), which combines the two switching signals to form a control signal for the safety switching element (22).

10. The firing circuit as claimed in claim 9, characterized in that the logic circuit (17) is designed as an AND element.

11. The firing circuit as claimed in claim 1, characterized in that the control device (3) is designed as a microcontroller or microprocessor and the two switching signals are emitted to different outputs (14, 16) of the same.

12. The firing circuit as claimed in claim 1, characterized in that the input of the holding circuit is connected to a monitoring device (10), sensing the switching state of the safety switch (1), and the output signal of which forms the first switching signal.

13. The firing circuit as claimed in claim 1, characterized in that, in addition to the voltage supply of the second firing stage (8, 9, 9'), provided via the safety switching element (22), a second voltage supply is provided.

14. The firing circuit as claimed in claim 13, characterized in that the second voltage supply comprises a connecting line (24) which is connected to the output of the safety switch (1) or to the first firing stage (2) and is connected to the input of a firing transistor (9) of the second firing stage (8, 9, 9').

15. The firing circuit as claimed in claim 14, characterized by a diode (25) inserted into the connecting line (24).

16. A motor vehicle occupant protection system with at least one occupant protection component triggering in multiple stages and is to be triggered in the event of an accident of the motor vehicle, in particular an airbag or a belt tensioner, and a firing circuit for triggering the occupant protection component, characterized in that the firing circuit has at least two firing stages for triggering an occupant protection component firing in at least two stages, each firing stage having at least one firing pellet and a switching element which is connected in series with said firing pellet for control by a control device, and with a safety switch, which responds to a physical parameter and releases a current feed to at least one of the firing stages when a certain threshold value is exceeded, but otherwise blocks said feed, the second firing stage, provided for the firing of the second stage of the occupant protection component, being connected to an electronic safety switching element, the control terminal of which is coupled to the safety switch and placed into the switched-through state by the safety switch, and a holding circuit connected between the safety switch and the control terminal of the switching element, the holding circuit being activated and applying a driver signal to the control terminal with a certain minimum time period when the safety switch closes.

* * * * *